(12) United States Patent
Bergmark et al.

(10) Patent No.: US 9,783,092 B2
(45) Date of Patent: Oct. 10, 2017

(54) KAYAK SEAT

(71) Applicants: Geoffrey M. Bergmark, Bangor, ME (US); Robert J. McDonough, Bangor, ME (US); Mathew S. Cardinali, Bangor, ME (US)

(72) Inventors: Geoffrey M. Bergmark, Bangor, ME (US); Robert J. McDonough, Bangor, ME (US); Mathew S. Cardinali, Bangor, ME (US)

(73) Assignee: Johnson Outdoors Inc., Racine, WI (US)

( * ) Notice: Subject to any disclaimer, the term of this patent is extended or adjusted under 35 U.S.C. 154(b) by 38 days.

(21) Appl. No.: 14/815,558

(22) Filed: Jul. 31, 2015

(65) Prior Publication Data

US 2016/0031532 A1     Feb. 4, 2016

Related U.S. Application Data

(60) Provisional application No. 62/032,356, filed on Aug. 1, 2014.

(51) Int. Cl.

| | |
|---|---|
| *B60N 2/02* | (2006.01) |
| *B60N 2/06* | (2006.01) |
| *B60N 2/22* | (2006.01) |
| *A47C 1/032* | (2006.01) |
| *B60N 2/68* | (2006.01) |
| *B60N 2/16* | (2006.01) |
| *B60N 2/24* | (2006.01) |
| *B60N 2/30* | (2006.01) |
| *B63B 35/71* | (2006.01) |
| *B63B 29/04* | (2006.01) |

(52) U.S. Cl.
CPC ............... *B60N 2/686* (2013.01); *B60N 2/06* (2013.01); *B60N 2/163* (2013.01); *B60N 2/169* (2013.01); *B60N 2/24* (2013.01); *B60N 2/3011* (2013.01); *B60N 2002/2204* (2013.01); *B63B 2029/043* (2013.01); *B63B 2035/715* (2013.01)

(58) Field of Classification Search
CPC .......... B63B 2029/043; B63B 235/715; B60N 2/686; B60N 2/06; B60N 2/163; B60N 2/169; B60N 2/24; B60N 2/3011; B60N 2002/2204
USPC ....... 297/353, 452.23, 452.24, 452.25, 378.1
See application file for complete search history.

(56) References Cited

U.S. PATENT DOCUMENTS

| | | | |
|---|---|---|---|
| 430,218 A | 6/1890 | O'Leary | |
| 2,208,745 A * | 7/1940 | Bloomberg | ............ A47C 7/185 |
| | | | 297/452.25 |
| 3,215,470 A | 11/1965 | Swenson et al. | |
| 4,498,702 A | 2/1985 | Raftery | |
| 4,521,053 A | 6/1985 | de Boer | |

(Continued)

*Primary Examiner* — Rodney B White
(74) *Attorney, Agent, or Firm* — Reinhart Boerner Van Deuren P.C.

(57) ABSTRACT

A kayak seat is provided that includes a seat base, and a seat pan supported by, and attached to, the seat base. The seat pan is made from a flexible material such that the seat pan is configured to be adjustable. The seat pan is configured to support the pelvis and thighs of a user seated in the seat pan. A seat back is attached to the seat base. A first adjustment mechanism is configured to adjust a position of the seat pan from a single point of adjustment. A second adjustment mechanism is configured to adjust a position of the seat back.

11 Claims, 6 Drawing Sheets

(56) References Cited

U.S. PATENT DOCUMENTS

| | | | | |
|---|---|---|---|---|
| 4,552,404 A | * | 11/1985 | Congleton | A47C 1/022 297/452.25 X |
| 4,607,882 A | * | 8/1986 | Opsvik | A47C 9/002 297/452.25 X |
| 4,616,877 A | * | 10/1986 | Slaats | A47C 7/402 297/353 |
| 4,643,481 A | * | 2/1987 | Saloff | A61G 5/1043 297/452.25 |
| 4,709,961 A | | 12/1987 | Hill | |
| 5,018,788 A | * | 5/1991 | Cedergreen | A47C 3/16 297/378.1 |
| 5,356,201 A | | 10/1994 | Olson | |
| 5,419,614 A | | 5/1995 | Richards et al. | |
| 5,575,534 A | * | 11/1996 | Yu | A47C 7/022 297/353 X |
| 5,658,047 A | * | 8/1997 | Ratza | B63B 29/04 297/378.1 X |
| 5,820,220 A | * | 10/1998 | Wu | A47C 7/407 297/378.1 |
| 6,089,669 A | * | 7/2000 | Wilcox | A47C 1/12 297/378.1 |
| 6,112,693 A | | 9/2000 | Addison | |
| 6,189,973 B1 | * | 2/2001 | Wu | A47C 4/52 297/378.1 |
| 6,464,300 B2 | * | 10/2002 | Grove | A47C 4/04 297/378.1 |
| 6,736,084 B2 | | 5/2004 | McDonough et al. | |
| 6,811,218 B2 | * | 11/2004 | Hasenour | A47C 3/18 297/452.25 X |
| 6,990,920 B2 | | 1/2006 | Hamilton et al. | |
| 7,445,287 B2 | * | 11/2008 | Chou | A47C 1/026 297/353 X |
| 7,472,959 B1 | * | 1/2009 | Ratza | A47C 7/407 297/378.1 |
| 7,607,738 B2 | * | 10/2009 | Gregory | A47C 7/022 297/452.23 |
| 8,960,799 B2 | * | 2/2015 | Yoon | A47C 7/021 297/378.1 X |
| 2002/0063460 A1 | * | 5/2002 | Roslund, Jr. | A47C 7/402 297/353 |
| 2007/0246988 A1 | * | 10/2007 | Hung | A47C 1/023 297/353 |

* cited by examiner

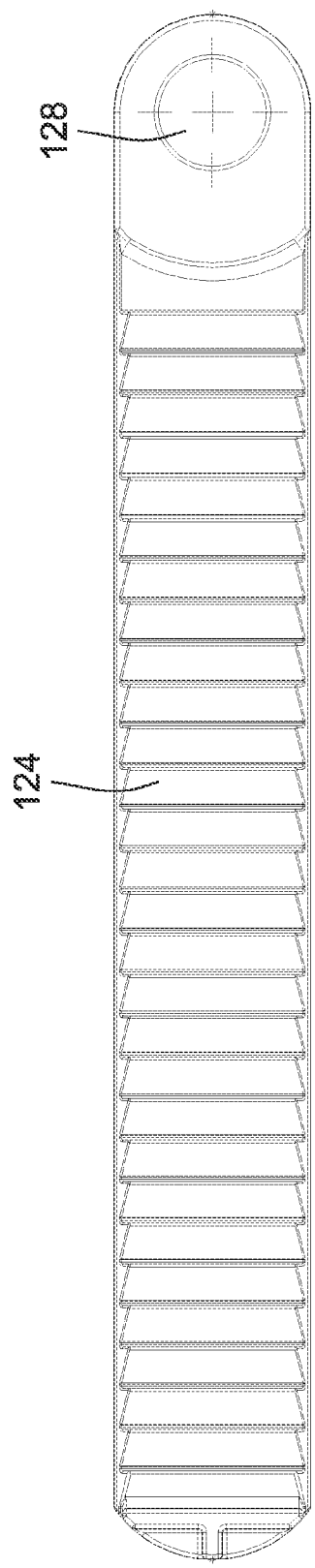
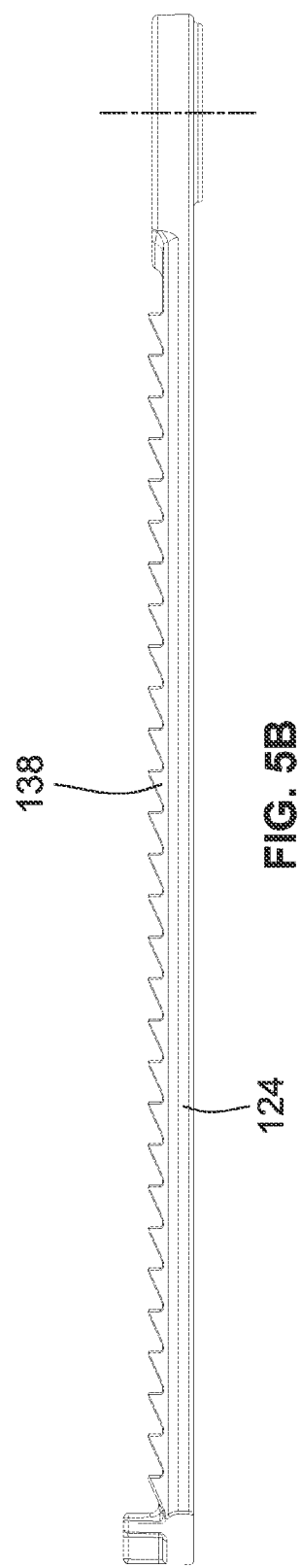
FIG. 5A
FIG. 5B

KAYAK SEAT

CROSS-REFERENCE TO RELATED PATENT APPLICATIONS

This patent application claims the benefit of U.S. Provisional Patent Application No. 62/032,356, filed Aug. 1, 2014, the entire teachings and disclosure of which are incorporated herein by reference thereto.

FIELD OF THE INVENTION

This invention generally relates to kayak seats, and, more particularly, to kayak seats with adjustment mechanisms.

BACKGROUND OF THE INVENTION

There is a need among kayak users for seating arrangements configured to accommodate a variety of body types. In particular there is a need for kayak seating arrangements which have adjustable seating pans and backs.

Embodiments of the invention provide such a seating arrangement. These and other advantages of the invention, as well as additional inventive features, will be apparent from the description of the invention provided herein.

BRIEF SUMMARY OF THE INVENTION

In one aspect, embodiments of the invention provide a kayak seat is provided that includes a seat base, and a seat pan supported by, and attached to, the seat base. The seat pan has a crescent-shaped cut-out located on each side of the seat. The seat pan is made from a flexible material such that the seat pan is configured to be adjustable. The seat pan is configured to support the pelvis and thighs of a user seated in the seat pan. A seat back is attached to the seat base. A first adjustment mechanism is configured to adjust a position of the seat pan from a single point of adjustment. A second adjustment mechanism is configured to adjust a position of the seat back.

In certain embodiments, the first adjustment mechanism includes a ratcheting mechanism. The ratcheting mechanism may include a first ratchet strap attached along a first side of the seat base, and a second ratchet strap attached along a second side of the seat base opposite the first side. In some embodiments, the single point of adjustment includes a crossbar that extends the width of the seat pan, wherein one end of the crossbar is attached to a first ratchet pawl assembly and another end of the crossbar, opposite the one end, is attached to the second ratchet pawl assembly. In a further embodiment, the single point of adjustment comprises a front edge of the seat pan, and wherein the position of the seat pan is adjusted by lifting the front edge of the seat pan, the ratcheting mechanism being configured to lock the seat pan position. In certain embodiments, the single point of adjustment is accessible through an opening in the seat pan, wherein the opening is sized to allow manual access to a component of the first adjustment mechanism. In certain particular embodiments, the component is a crossbar having the first and second ratchet pawl assemblies attached at opposite ends of the crossbar.

In particular embodiments, the manual manipulation of the crossbar is configured to lower the position of the seat pan from a raised position. In certain embodiments, the kayak seat includes a first and a second ratchet pawl assembly disposed on the first and ratchet straps, respectively, each ratchet pawl assembly configured to slide back and forth along its respective ratchet strap to set the position of the seat pan. In at least embodiment, the seat base includes a first and a second vertical tower portion that extend perpendicularly from opposite sides of the seat base such that the first and a second vertical tower portions rise above opposite sides of the seat pan, and wherein the first and second ratchet straps are attached to the first and second vertical tower portions, respectively.

The second adjustment mechanism may include a first and a second ratcheting assembly configured to adjust the seat back forward and backward. Furthermore, the seat base may be attached to the seat back by a vertical riser that vertically separates the seat pan from the seat back. The seat pan, seat base, and seat back may all be made from molded plastic. In particular embodiments, the single point of adjustment is accessible through an opening in the seat pan.

In another aspect, embodiments of the invention provide a method of adjusting a kayak seat position. The method includes providing a kayak seat. The kayak seat includes a seat base, and a seat pan supported by, and attached to, the seat base. The seat pan has a crescent-shaped cut-out located on each side of the seat. The seat pan is made from a flexible material such that the seat pan is configured to be adjustable. The seat pan is configured to support the pelvis and thighs of a user seated in the seat pan. A seat back is attached to the seat base. A first adjustment mechanism is configured to adjust a position of the seat pan from a single point of adjustment. A second adjustment mechanism is configured to adjust a position of the seat back. The method further includes lifting a front edge of the seat pan, at a single point of adjustment, to position the seat pan in a raised posture. The method also includes manually manipulating a component of the first adjustment mechanism, at a single point of adjustment, to lower the seat pan from the raised posture.

In a particular embodiment, the method calls for manually manipulating a cross bar underneath the seat pan through an opening in the seat pan. The first and second adjustment mechanisms may include first and second ratcheting mechanisms, respectively. In some embodiments, the method includes manually adjusting the second adjustment mechanism to move the seat back forward or backward.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 5A and 5B show top and side views, respectively, of a ratchet strap, according to an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
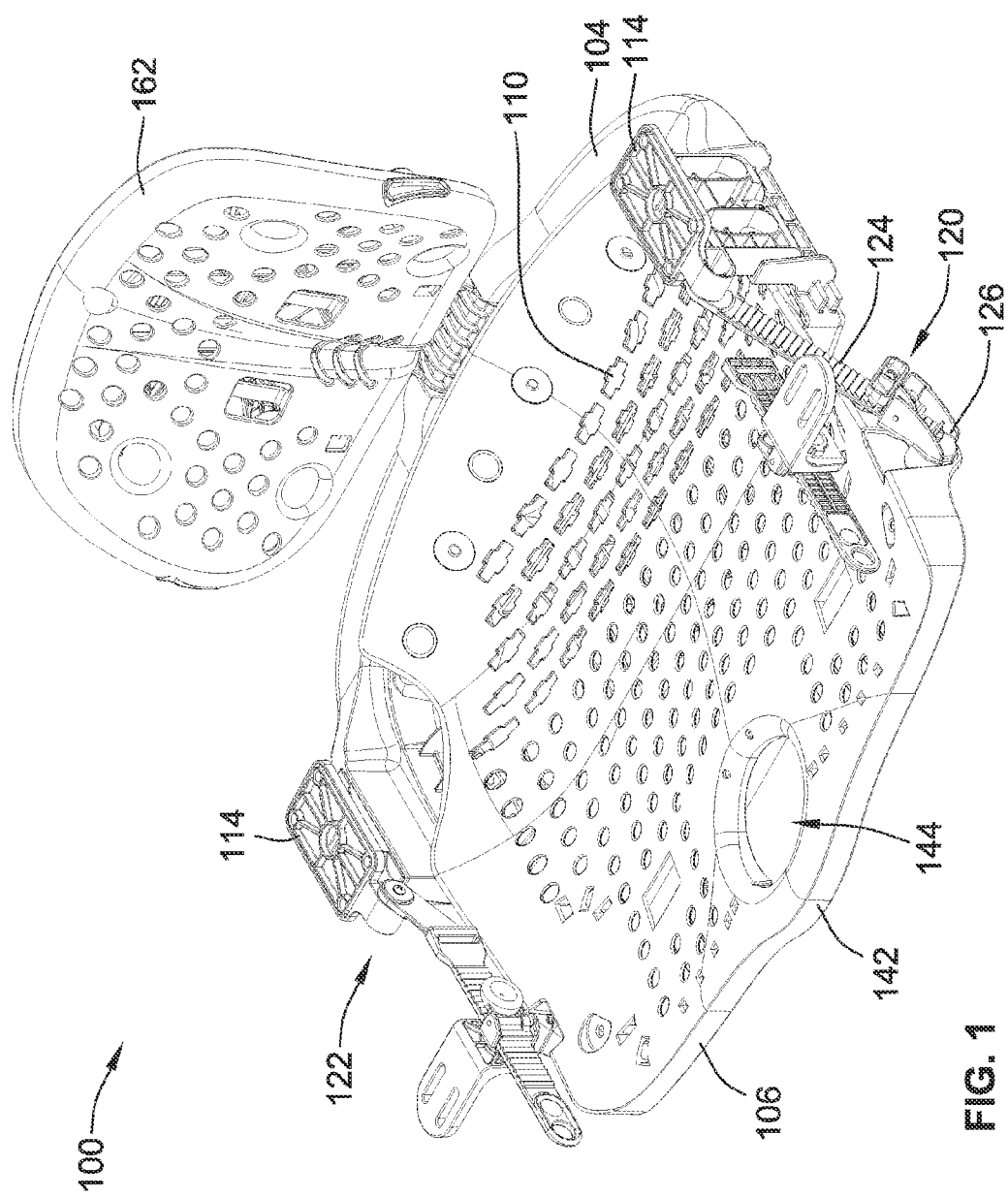
FIG. 1 is a perspective view of a kayak seat assembly as seen from above, in accordance with an embodiment of the invention.
Figure 2:
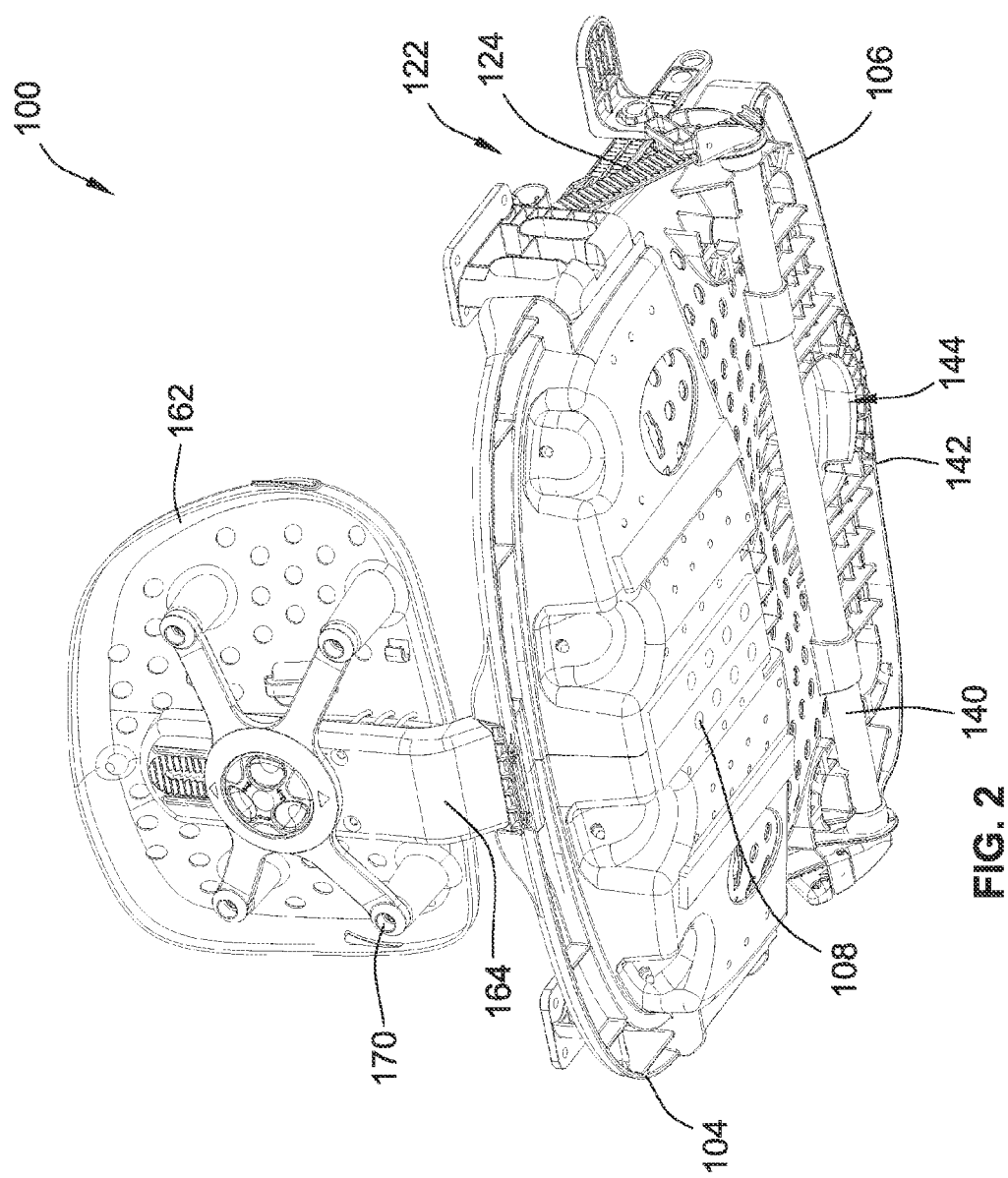
FIG. 2 is a perspective view of the kayak seat assembly as seen from below, in accordance with an embodiment of the invention.
Figure 3:
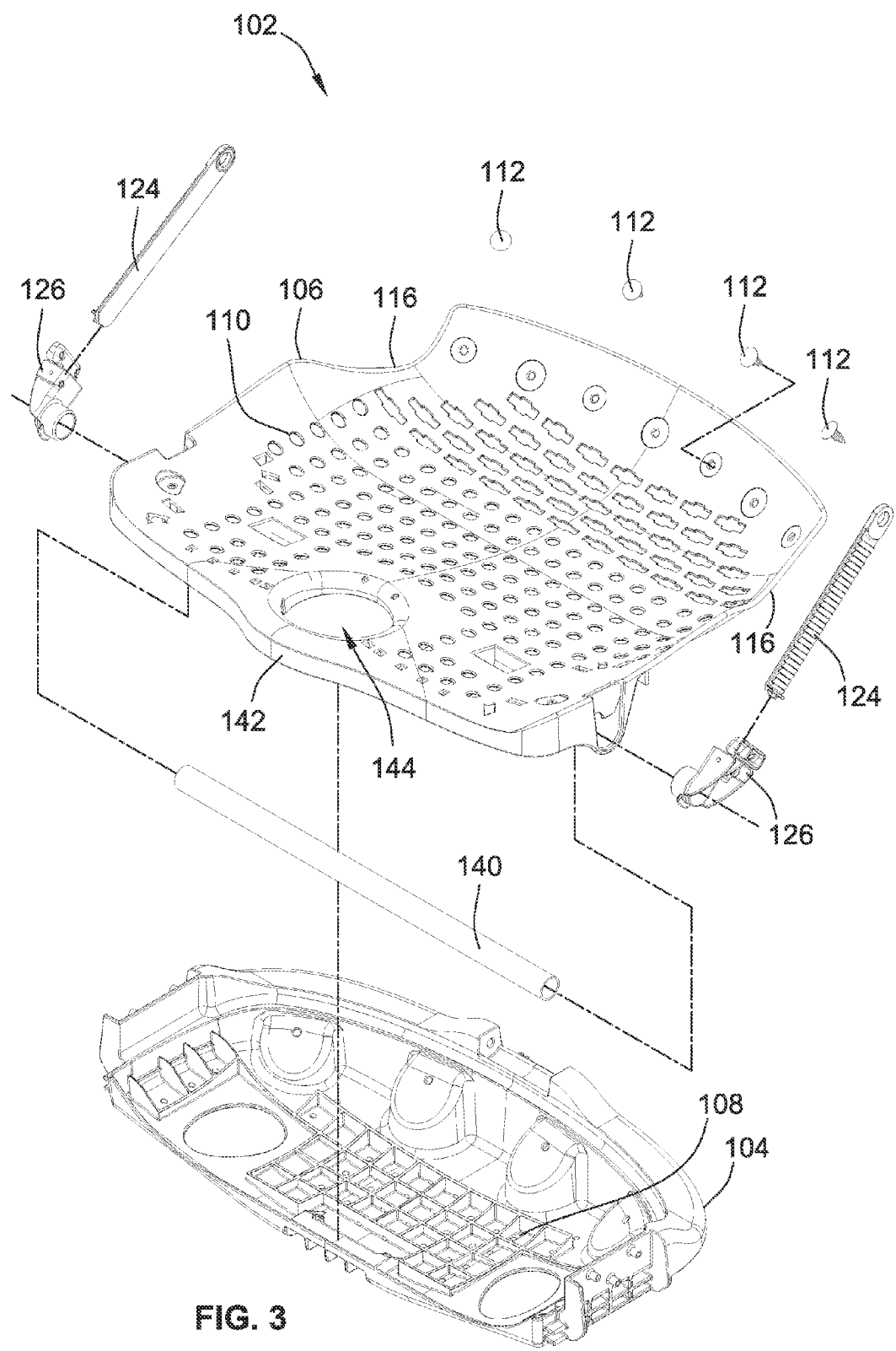
FIG. 3 is an exploded view of the kayak seat base and seat pan assembly, according to an embodiment of the invention.
Figure 4:
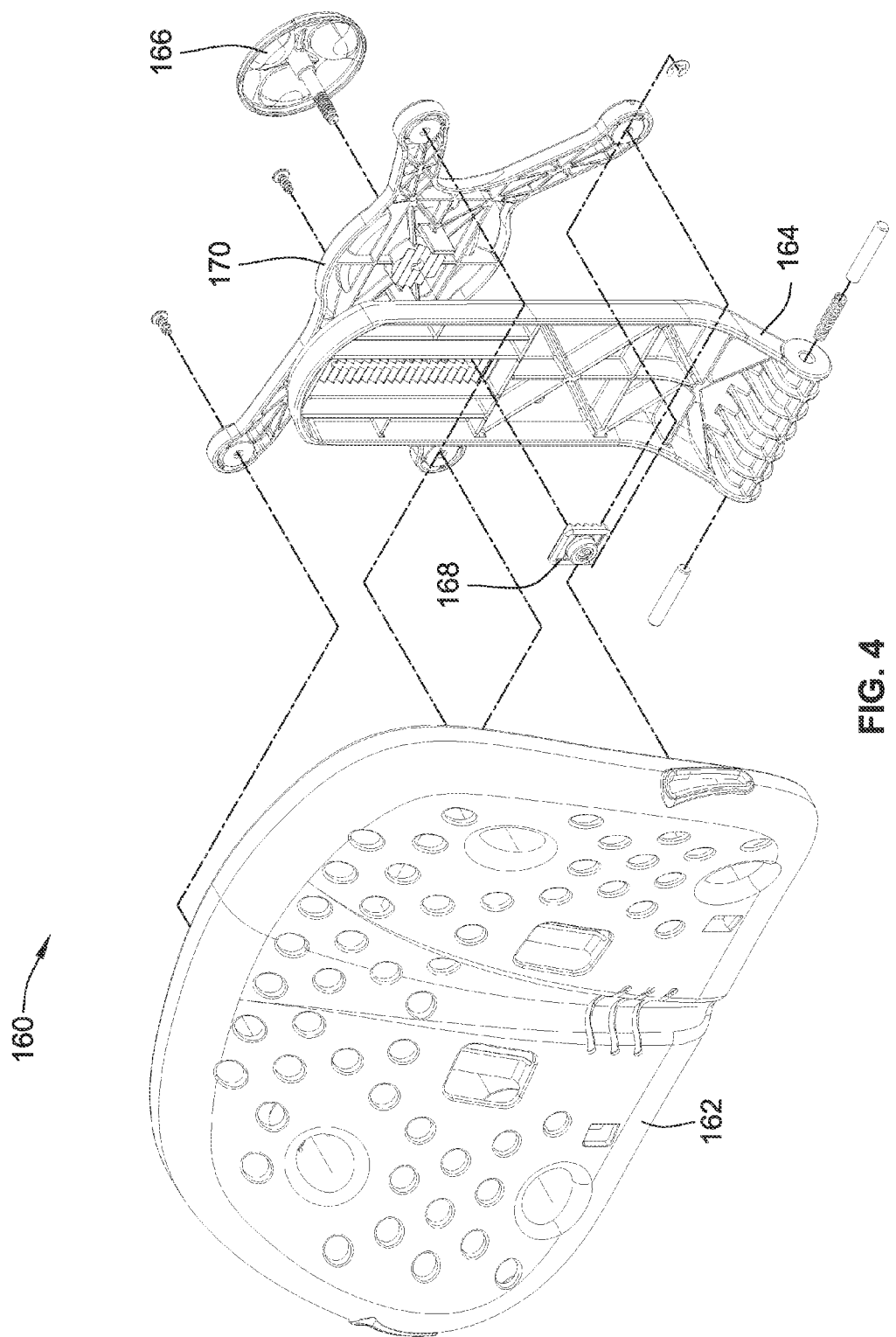
FIG. 4 is an exploded view of the kayak seat back assembly, according to an embodiment of the invention.

FIGS. 1 and 2 show perspective views of a kayak seat assembly 100, constructed in accordance with an embodiment of the invention. FIGS. 3 and 4 show exploded views of the seat base assembly 102 and the seat back assembly 160, respectively, according to an embodiment of the invention. The kayak assembly 100 includes the seat base assembly 102 with a seat base 104 and seat pan 106. The kayak assembly 100 further includes a seat back assembly 160 having a seat back 162 and a vertical riser 164. The seat base assembly 102 and seat back assembly 160 are attached via the vertical riser 164. In particular embodiments of the invention, all of the above-listed components of the kayak seat assembly 100 are made from molded plastic.

The seat base 104 may be configured to be removably attached in a kayak (not shown). In certain embodiments, the seat base 104 has a slightly convex shape such that, when assembled in the kayak, the outwardly-curved portion of the seat base 104 faces downward toward the kayak. In particular embodiments, the seat base 104 has a number of through-holes 108 which allow water to drain out of the seat base 104. The seat pan 106 is shaped to fit within the seat base 104. Thus, in some embodiments, the seat pan 106 will have a slightly convex shape to match that of the seat base 104. Further, the seat pan 106 may include a number of through-holes 110 which allow water to drain out of the seat pan 106.

It is envisioned that the seat pan 106 will typically be made from a flexible material, such as molded plastic, in order to facilitate manual adjustment of the seat assembly 100. As can be seen in FIG. 3, the seat pan 106 has a crescent-shaped cut-out 116 on each side of the seat pan 106. The crescent-shaped cut-out 116 facilitates bending of the flexible seat pan 106 at the location of the crescent-shaped cut-outs 116. Without the crescent-shaped cut-outs 116, any bending of the seat pan 106 results in an outward bulging of the seat pan 106 at the location of the bending. Stress points would be concentrated at the locating of the outward bulging such that breakage or degradation of the seat pan 106 could occur at this bending location. The crescent-shaped cut-outs 116 eliminate the stress concentration and breakage that would occur without the cut-outs 116, and facilitates the bending of the seat pan 106 that occurs during manual adjustment of the seat pan 106. Such manual adjustment is described in more detail below.

The seat pan 106 and seat base 104 may also include threaded openings aligned so that threaded fasteners, such as bolts, may be used to attach the seat pan 106 to the seat base 104. It is also envisioned that non-threaded fasteners, such as push-in rivets 112, in non-threaded openings may be used to attach the seat pan 106 and seat base 104. Other non-permanent means for attaching the seat pan 106 and seat base 104 are also envisioned. In the embodiments shown, seat pan 106 is attached directly on top of the seat base 104. Further, in this embodiment, the seat base 104 accommodates the full width of the seat pan 106, but only a portion of the depth of the seat pan 106.

As shown in FIGS. 1-3, the seat base 104 supports a rear portion of the seat pan 106, roughly where the pelvis of a user would be positioned when seated in the seat pan 106. As can also be seen, the front portion of seat pan 106, normally supporting the thighs of a seated user, is not directly supported by the seat base 104.

The seat base assembly 102 includes two vertical towers 114, one attached on each side of the seat base 104. The vertical towers 114 rise above the seat base 104 and seat pan 106, and, like the seat base 104, are positioned towards the rear of the seat pan 106.

As stated above the seat base assembly 102 is attached to the seat back assembly 160 via the vertical riser 164. In the embodiments shown, the vertical riser 164 is attached to a rear edge of the seat base 104 approximately centered between the two sides of the seat base 104. The vertical riser 164 is also attached to a rear portion of the seat back 162, roughly centered along the width of the seat back 162. In the embodiment of FIG. 4, the vertical riser 164 is attached to the seat back 162 via a threaded backrest knob 166 and riser lock plate 168. In particular embodiments, a backrest base 170 has four arms, wherein the end of each arm is attached, via threaded fastener for example, to the back of the seat back 162. The backrest base 170 is also connected to the vertical riser 164 by the threaded backrest knob 166.

The kayak seat assembly 100 includes a first adjustment mechanism 120 and a second adjustment mechanism 122, which together are configured to adjust the position of the seat pan 106. More specifically, the first and second adjustment mechanisms 120, 122 are configured to adjust the position of the seat pan 106 from a single point of adjustment. In a particular embodiment, the first and second adjustment mechanisms 120, 122 are ratchet mechanisms. Each ratchet mechanism 120, 122 includes a ratchet strap 124 and a ratchet pawl assembly 126. In certain embodiments, the two ratchet pawl assemblies 126 are attached to each side of the seat base 104. More specifically, the two ratchet pawl assemblies 126 are attached to a crossbar 140 that runs along the underside of the seat pan 106 across the full width of the seat pan 106. In the embodiment shown, the underside of the seat pan 106 has several openings designed to accommodate the crossbar 140 and hold it in place underneath the seat pan 106.

Figure 6:
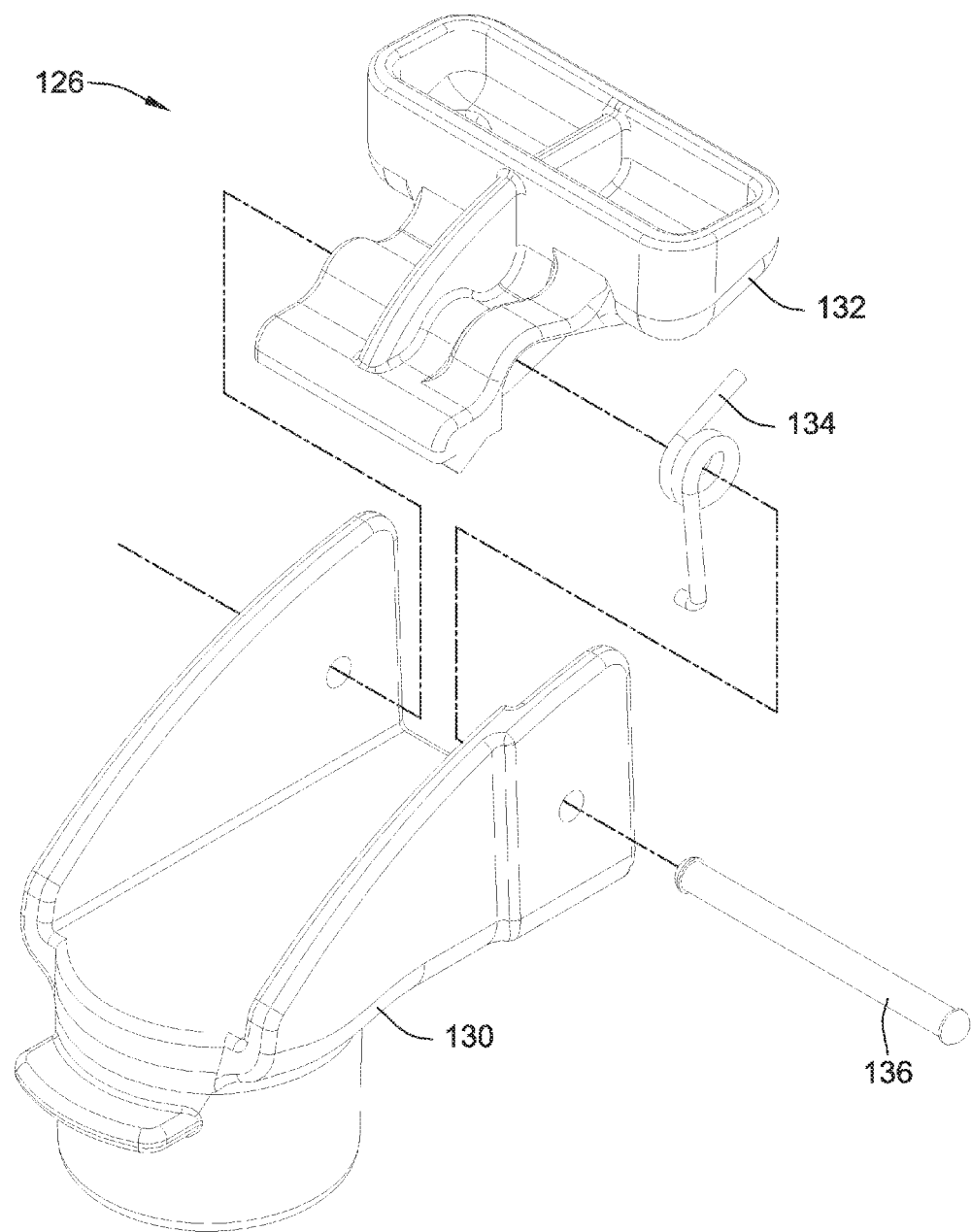
FIG. 6 is an exploded perspective view of a ratchet pawl assembly, constructed in accordance with an embodiment of the invention.

FIGS. 5A and 5B show top and side views, respectively, of a ratchet strap 124, while FIG. 6 shows an exploded perspective view of a ratchet pawl assembly 126, constructed in accordance with an embodiment of the invention. As can be seen from FIGS. 5A and 5B, the ratchet strap 124 has one end with a ratchet strap through-hole 128, which is configured to be placed over a projection (not shown) on either the first or second vertical tower 114 so that the ratchet strap 124 is held stationary where held by the vertical tower 114. The ratchet strap 124 also includes a plurality of evenly-spaced angled ridges 138 that runs most of the length of the ratchet strap 124.

The ratchet pawl assembly 126 of FIG. 6 comprises a ratchet base 130, a ratchet pawl 132, a torsion spring 134. These three components are held together by a ratchet pin 136 that fits through aligned openings in the ratchet base 130, a ratchet pawl 132, and torsion spring 134. When the ratchet strap 124 is inserted through the ratchet pawl assembly 126, the torsion spring 134 biases the ratchet pawl 132 against the plurality of angled ridges 138 such that the ratchet pawl assembly 126 does not move and the seat pan 106 is held in position.

When a user, seated in the seat pan 106, pulls up on a front edge 142 of the seat pan, the ratchet pawl assemblies 126 slide up along the ratchet straps 124. The kayak seat assembly 100 is designed such that the seat pan position can be adjusted by one hand (i.e., pulling up on the front edge 142). When the front edge 142 is released, the ratchet pawl 132, being biased, by the torsion spring 134, against the angled ridges 138, prevents the ratchet pawl assemblies 126, and therefore the seat pan 106, from sliding back down the ratchet straps 124, thus keeping the seat pan 106 in the adjusted position.

The seat pan 106 can also be lowered from a single point of adjustment. When the user, seated in the seat pan 106, manipulates the crossbar 140, both of the ratchet pawls 132 are lifted and released allowing the two ratchet pawl assemblies 126 to slide down their respective ratchet straps 124. In certain embodiments, the seat pan 106 includes an opening 144 designed to provide the user manual access to the crossbar 140. In this way, the user can, with one hand, lower the position of the seat pan 106.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A kayak seat comprising:
    a seat base;
    a seat pan supported by, and attached to, the seat base, the seat pan being made from a flexible material such that the seat pan is configured to be adjustable, the seat pan having a crescent-shaped cut-out on each side thereof, the seat pan being configured to support the pelvis and thighs of a user seated in the seat pan;
    a seat back attached to the seat base;
    a first adjustment mechanism configured to adjust a position of the seat pan from a single point of adjustment; and
    a second adjustment mechanism configured to adjust a position of the seat back;
    wherein the first adjustment mechanism comprises a ratcheting mechanism; and
    wherein the ratcheting mechanism comprises a first ratchet strap attached along a first side of the seat base, and a second ratchet strap attached along a second side of the seat base opposite the first side.

2. The kayak seat assembly of claim 1, wherein the single point of adjustment comprises a front edge of the seat pan, and wherein the position of the seat pan is adjusted by lifting the front edge of the seat pan, the ratcheting mechanism being configured to lock the seat pan position.

3. The kayak seat assembly of claim 1, further comprising a first and a second ratchet pawl assembly disposed on the first and second ratchet straps, respectively, each ratchet pawl assembly configured to slide back and forth along its respective ratchet strap to set the position of the seat pan.

4. The kayak seat assembly of claim 3, wherein the single point of adjustment comprises a crossbar that extends the width of the seat pan, wherein one end of the crossbar is attached to the first ratchet pawl assembly and another end of the crossbar, opposite the one end, is attached to the second ratchet pawl assembly.

5. The kayak seat assembly of claim 4, wherein manual manipulation of the crossbar is configured to lower the position of the seat pan from a raised position.

6. The kayak seat assembly of claim 3, wherein the single point of adjustment is accessible through an opening in the seat pan, wherein the opening is sized to allow manual access to a component of the first adjustment mechanism.

7. The kayak seat assembly of claim 6, wherein the component is a crossbar having the first and second ratchet pawl assemblies attached at opposite ends of the crossbar.

8. The kayak seat assembly of claim 1, wherein the seat base includes a first and a second vertical tower portion that extend perpendicularly from opposite sides of the seat base such that the first and a second vertical tower portions rise above opposite sides of the seat pan, and wherein the first and second ratchet straps are attached to the first and second vertical tower portions, respectively.

9. A method of adjusting a kayak seat position, the method comprising:
    providing a kayak seat, wherein the kayak seat includes:
        a seat base;
        a seat pan supported by, and attached to, the seat base, the seat pan having a crescent-shaped cut-out on each side thereof, the seat pan being made from a flexible material such that the seat pan is configured to be adjustable, the seat pan being configured to support the pelvis and thighs of a user seated in the seat pan;
        a seat back attached to the seat base;
        a first adjustment mechanism configured to adjust a position of the seat pan from a single point of adjustment; and
        a second adjustment mechanism configured to adjust a position of the seat back;

lifting a front edge of the seat pan, at a single point of adjustment, to position the seat pan in a raised posture; and manually manipulating a component of the first adjustment mechanism, at a single point of adjustment, to lower the seat pan from the raised posture;

wherein manually manipulating a component of the first adjustment mechanism comprises manually manipulating a cross bar underneath the seat pan through an opening in the seat pan.

10. A method of adjusting a kayak seat position, the method comprising:

providing a kayak seat, wherein the kayak seat includes:
a seat base;
a seat pan supported by, and attached to, the seat base, the seat pan having a crescent-shaped cut-out on each side thereof, the seat pan being made from a flexible material such that the seat pan is configured to be adjustable, the seat pan being configured to support the pelvis and thighs of a user seated in the seat pan;
a seat back attached to the seat base;
a first adjustment mechanism configured to adjust a position of the seat pan from a single point of adjustment; and
a second adjustment mechanism configured to adjust a position of the seat back;

lifting a front edge of the seat pan, at a single point of adjustment, to position the seat pan in a raised posture; and manually manipulating a component of the first adjustment mechanism, at a single point of adjustment, to lower the seat pan from the raised posture;

wherein the first and second adjustment mechanisms comprise first and second ratcheting mechanisms, respectively.

11. The method of claim 10, further comprising manually adjusting the second adjustment mechanism to move the seat back forward or backward.

* * * * *